INVENTOR
DALE R. OLDHAM

INVENTOR
DALE R. OLDHAM
BY
Woodard, Weikart, Emhardt & Naughton
Attorneys

United States Patent Office 3,448,473
Patented June 10, 1969

3,448,473
VEHICLE CLEANING BRUSH DRIVE SYSTEM
Dale R. Oldham, Phoenix, Ariz., assignor, by mesne assignments, to Earl Dallas Smith, Phoenix, Ariz.
Filed Aug. 28, 1967, Ser. No. 663,874
Int. Cl. B60s *3/06;* D06f *45/16*
U.S. Cl. 15—21
13 Claims

ABSTRACT OF THE DISCLOSURE

A hydraulic motor driven vehicle body cleaning brush normally disposed in the path of the vehicle and movable thereby in a horizontal arc about a vertical pivot to follow the contour of the vehicle as it is moved along the ground. An actuator responsive to pressures in the motor supply line at a certain brush load level to trigger a series of valve events reversing the hydraulic motor and thereby reversing the direction of brush rotation. A timing device operative following initiation of the valve events to enable return of the flow direction valve to initial condition, again reversing the hydraulic motor to return the brush rotation to its initial direction.

BACKGROUND OF THE INVENTION

Field of the invention

This invention relates generally to vehicle cleaning brush drive systems and more particularly to a system operative to reverse brush rotation upon sensing a load above a predetermined level.

Description of the prior art

In the car washing business, there is a trend toward automatic car washing equipment minimizing labor requirements. Some equipment has been devised which employs large brushes rotating on vertical axes supported on arms which are also pivoted on vertical axes so that a car being moved along the conveyor will meet such a brush at approximately the center line of the car, and will proceed to push the brush out of the way of the car as the car moves along. In some installations, these brushes thereby brush at least a portion of the front end of the car and continue brushing along the side of the car as the car moves along.

With the advent in very recent years of greater varieties of front-end shapes on cars, the matter of thoroughly brushing the entire front end is beset with problems sometimes resulting in damage to the cars or brushing units or both. Some efforts to solve these problems have included the selection of brush rotational direction and mounting such as to use the brush action itself in an effort to keep the brush from becoming lodged or overloaded in any cervice or depression in the car surfaces being brushed and tending to throw the brush away from the car under such circumstances. However this approach often results in irregular brush effort on the surfaces being brushed, intermittent contact, and occasional violent reactions on certain parts of the brushing equipment. In addition to the inadequate brushing job which results from such arrangements, there is a psychological disadvantage to such equipment because of the violent and erratic motions characteristic thereof. In contrast, the present invention provides a virtually continuous and uniform brushing effort which is both psychologically attractive and functionally effective.

SUMMARY

Described briefly, in a typical embodiment of the present invention, a vehicle cleaning brush is disposed in the path of the vehicle and is normally rotated in one direction by a hydraulic motor. Pressure sensing means are provided in the hydraulic supply to the motor so that, as pressure rise in the supply line occurs as a result of the vehicle moving the brush to a position where the load on the brush increases, the sensing means provided a sequence of valve events to reverse the hydraulic motor and thereby reverse the direction of brush rotation. Adjustable time delay means are provided in the valving system so that, at an adjustable delay after reversal of the motor, it is against automatically reversed so that the initial direction of rotation is reinstated, whereby virtually continuous and effective working contact of the brush is maintained with the vehicle body as the vehicle moves along and the brush follows the surface contour.

BRIEF DESCRIPTION OF THE DRAWING

The full nature of the invention will be understood from the accompanying drawings and the following description and claims.

DESCRIPTION OF THE PREFERRED EMBODIMENT

Figure 1:
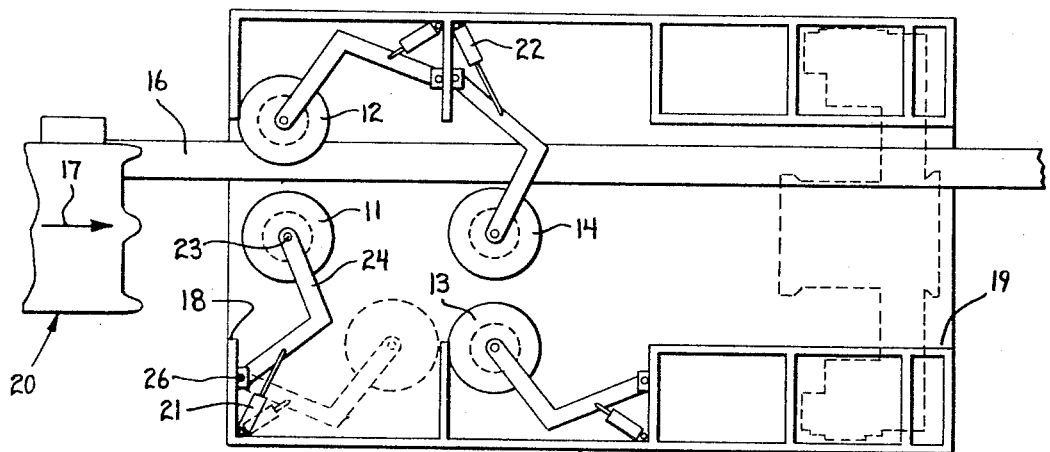
FIG. 1 is a schematic top plan view of an automatic car wash apparatus illustrating in the solid outlines the usual brush location as a vehicle approaches on the conveyor for washing.
Figure 2:
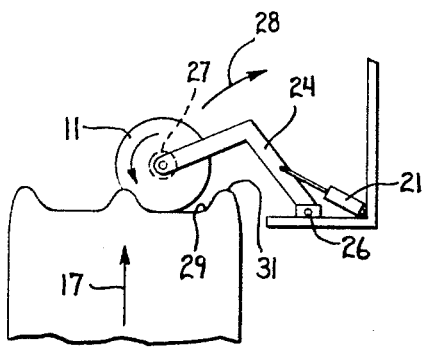
FIG. 2 is an enlarged fragmentary top plan view showing the first brush a few moments after it has been contacted and moved a bit by the front end of the advancing vehicle.
Figure 3:
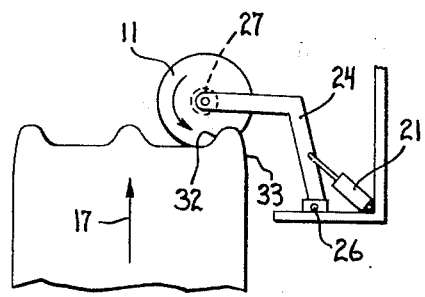
FIG. 3 is like FIG. 2 at a further stage of advance of the vehicle.

Referring now to FIGURE 1, a building 10 is provided with a set of vehicle body washing brushes 11, 12, 13, and 14 therein, and a conveyor 16 on the floor thereof for moving vehicle 20 in the direction of the arrow 17 through the entrance 18, through the building 10 and out through the exit 19. For purposes of example, each of the brushes is shown mounted for rotation on a vertical axis at the outer end of an L-shaped frame or arm, with a pneumatic actuator mounted to the building and connected to the arm for positioning of the brush. For example, brush 11 is normally disposed near the center of the path of the vehicle 20 and maintained in that position by pressure on a pneumatic actuator 21. The brush 11 is intended to wash the front end of the vehicle beginning at a point to the left of center and continuing around the front end and then the right-hand side of the vehicle. Similarly, the brush 14 normally disposed in the center of the path of the vehicle by the pneumatic actuator 22 is intended to wash the front of the vehicle from a point to the right of center and continue across toward the left side and along the left-hand side of the vehicle as it moves through the building. The other brushes 12 and 13 are intended to wash the sides of the vehicle and the rear end thereof. All brushes are typically provided with long flexible plastic bristles which are normally so flexible that when the brushes are not rotating, they hang vertically and occupy less space than when the brushes are rotating, as indicated by the dotted circles for the stationary condition of brushes as distinguished from the solid outlines for the bristle tips as the brushes are rotating.

In the normal sequence of events as the vehicle moves through the building, the vehicle pushes the brush 11 outward toward the position shown by the dotted outlines and, as the left front end of the vehicle has passed brush 12, the actuator for that brush advances it against the side of the vehicle. When the front end reaches brush 14, it pushes it out to the left toward a retracted position similar to that for brush 11 and after the front end has passed brush 13, its actuator moves it into engagement with the side of the vehicle. When the left rear end of the vehicle has come adjacent the brush 12, the brush begins to move across toward the center to brush the left rear end portion. Then its actuator reverses and returns it to the retracted position, while the actuator 21 for brush 11 moves it to the extended position shown in FIGURE 1. When the right rear end of the vehicle reaches brush 13, the brush begins to move across the rear end and cleans it, subsequent to which its actuator returns it to the retracted position and brush 14 is again extended to the center of the path by its actuator 22. This sequence of events, and control means by which it can be achieved, are described in a Patent No. 3,332,098 of Earl Dallas Smith, issued July 25, 1967.

To describe the present invention, reference is made to brush 11 mounted for rotation on a vertical axis 23 at the distal or free end of the generally L-shaped arm 24 pivotally mounted on a vertical axis to the building 10 at 26. Pneumatic ram 21 continuously urges the brush toward the center of the path of the car. The brush is normally driven in a counter-clockwise direction of rotation about the axis 23 by a hydraulic motor 27 mounted to the brush arm and inside of the brush hub. As the car is advanced in the direction of the arrow 17 by the conveyor 16, it swings the brush unit in the direction of the arrow 28 from the extended position in the path of the car toward the retracted position shown by the dotted outline in FIGURE 1. Accordingly the brush moves along toward the crevice or concavity 29 in the front end of the car between the usual front end grill location and the front marginal edge 31 of the bumper and fender assembly. When this occurs, continued advance of the car makes it more difficult for the brush to continue rotating in the counter-clockwise direction, because the direction of motion of the bristles at the point of contact with the car is toward the outside of the path of the car, tending to drive the brush toward the center of the path, and toward the center of the car. Yet the brush cannot move in that direction because of the pivotal connection of the arm at 26 and the rigid nature of the frame so, as the car continues to move forward the resistance to counter-clockwise brush rotation continues to increase, particularly when the bristles engage the faces 32 of the front fender which face toward the center of the path of the car.

According to the present invention, the hydraulic motor is reversed when the advance of the car causes the load to increase to a certain level. Immediately clockwise rotation of the brush begins so that the bristles are moving toward the center of the car at the point of contact therewith, tending to move the brush toward the front end margin 31 of the fender and then around the front end into contact with the side of the fender at 33. Continued clockwise rotation of the brush would tend to move the brush toward the rear of the car, the bristles moving toward the front at the point of contact thereof with the car.

Figure 4:
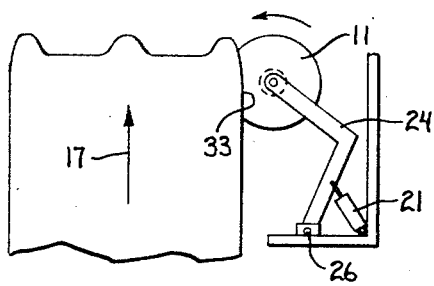
FIG. 4 is a view like FIG. 2 a still further stage of advance of the vehicle.

Because the clockwise rotation of the brush tends to aid the outward swinging of the brush in the direction of the arrow 28 toward retracted position, the torque load is substantially less than it would have been if the brush were forced around the front end in spite of continued counter-clockwise rotation. However, the counter-clockwise rotation is again reinstated shortly after the front end has passed the brush so that when the relationship is such as indicated in FIGURE 4, the brush is again working toward the rear of the car at the point of contact of the bristles thereof with the side of the car. The brush continues to rotate against the car until the car has passed. At that time the brush is again in the center of the path of the next car, whereupon the cycle can repeat.

Figure 5:
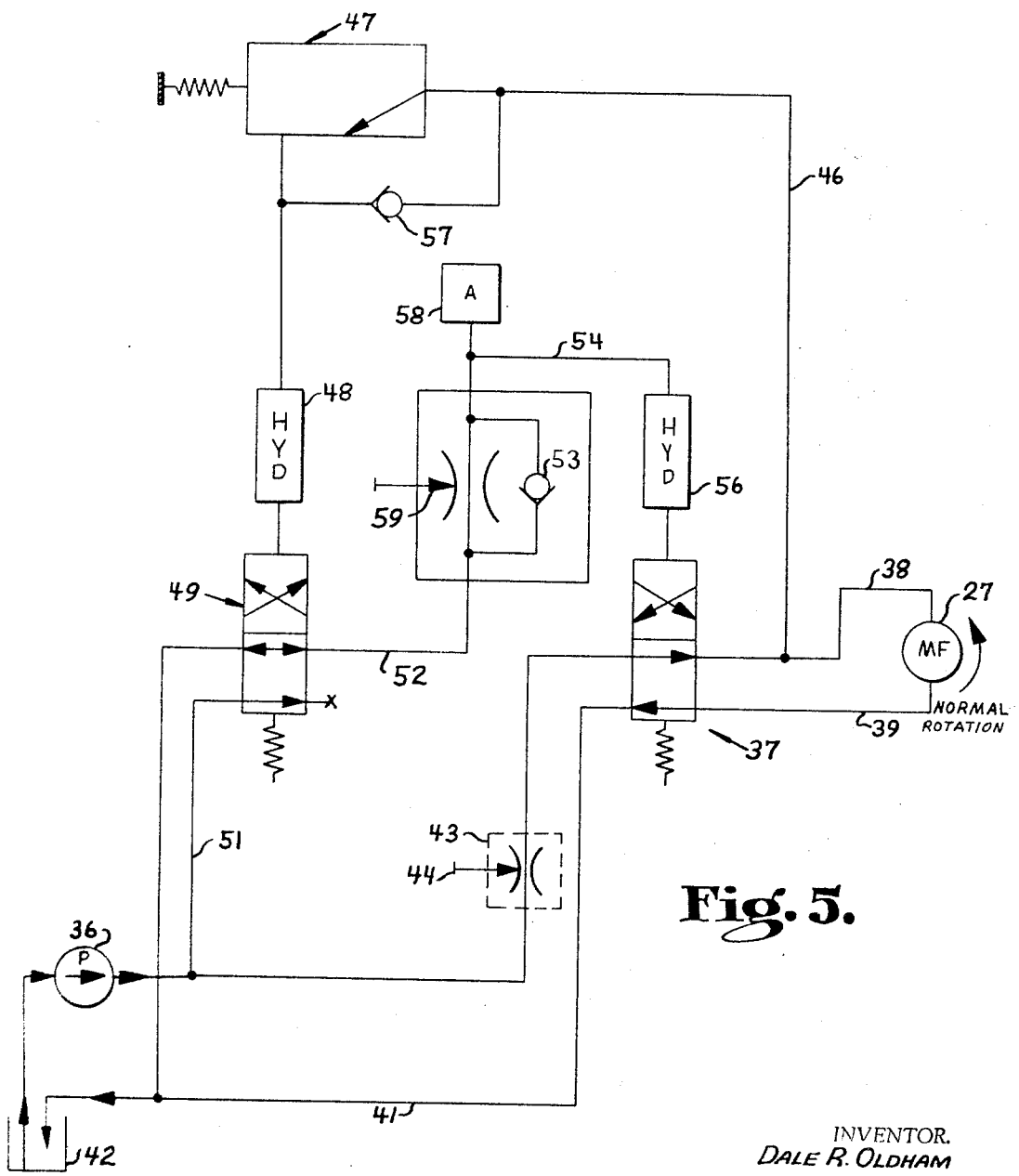
FIG. 5 is a schematic hydraulic diagram of a sensing and control system according to a typical embodiment.

The attainment of this action is implemented in a preferred embodiment by the system of FIGURE 5 wherein a series of valves serve as switches in a manner which will now be described. A power source in the form of a hydraulic pump 36 provides hydraulic fluid at a pressure of 1,000 pounds per square inch (p.s.i.) to a first switch in the form of a two-position four-way hydraulic valve 37 and supply line 38 to the hydraulic brush drive motor 27, the hydraulic fluid being returned through line 39 and valve 37 and line 41 to an energy sink which, in this instance, is a hydraulic fluid reservoir 42. The fluid is supplied from the pump through a flow control valve 43 which may be adjustable at 44 to set the flow at 8 gallons per minute, for example. The normal counter-clockwise rotation of the motor 27 and brush 11 is thereby achieved.

In order to sense the increased load as the car moves the brush outwardly, the hydraulic pressure in line 38 is applied through line 46 to a valve 47. When the pressure rise in line 38 in response to increased brush resistance torque has risen to a certain level predeterminable by adjustment of valve 47, the valve shifts to apply pressure in line 46 to the pilot 48 to shift valve 49. Valve 49 thereupon shifts from the position shown in FIG. 5 to its second position whereupon pump pressure from line 51 is applied through valve 49, line 52, check valve 53 and line 54 to pilot 56 to shift the motor directional control valve 37.

Upon the shifting of valve 37 to its second position, pump pressure is applied to brush drive motor through line 39, and line 38 is vented through valve 37 and line 41 to the sump. This reverses the motor so it drives the brush clockwise.

Upon the shifting of valve 37, the pressure drops in line 46, whereupon valve 47 is returned by its spring to initial condition. Also the pressure in pilot 48 is relieved through check valve 57 to line 46, whereupon the return spring returns valve 49 to inital position. This stops flow in line 51 and permits pilot pressure in line 54 and accumulator 58 to begin to bleed back through restriction 59, line 52, and valve 49 to sump. When pilot pressure has dropped sufficiently, the return spring returns valve 37 to its original position. This reinstates the original direction of flow to the brush motor 27, thus reversing the motor 27 and reinstating counter-clockwise brush rotation.

The load sensing actuator valve 47 can be set to respond to whatever hydraulic pressure rise limit is desired before shifting and starting the valve sequence. A pressure rise of 200 to 300 p.s.i. is an example. The configuration of the front ends of some cars will be such as to cause very little pressure rise because of comparatively low resistance to counter-clockwise brush rotation and, in that event, brush reversal will not be needed and will not occur.

The accumulator, which may have a 100 p.s.i. precharge of air or nitrogen, for example, provides an extra volume on the order of three cubic inches of hydraulic fluid, maintaining the reversed (clockwise) brush rotation for several seconds, and the restriction 59 can be adjusted to adjust the time. Usually about two seconds, for three or four clockwise brush revolutions, is adequate for the brush to move around the front edge of the front fender.

Figure 6:
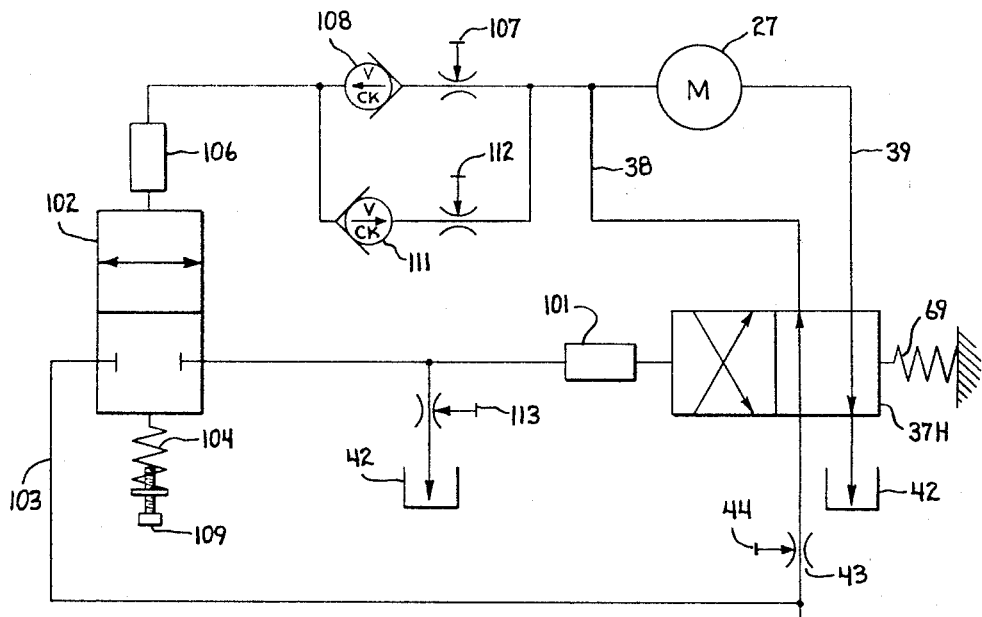
FIG. 6 is a schematic hydraulic diagram of a further embodiment of sensing and control system.

In the embodiment of FIGURE 6 also, hydraulic pressure is used for the valve piloting. In this example, a valve 37H is shown schematically in place of value 37 of FIGURE 5 and achieves the same purpose of reversing flow to the brush drive motor. In this instance, however, it is operated by hydraulic pilot 101 when the valve 102 is shifted from the position shown to connect the pilot pressure line 103 to the pilot 101. The shifting of valve 102 against the bias of return spring 104 is accomplished by the valve pilot 106 when the pressure applied thereto from the high pressure line 38 of the motor through the flow control valve 107 and check valve 108 reaches a certain level which is determinable by the adjustment 109 on the valve return spring. After reversal of the motor, the pressure in pilot 106 can drop to the motor downstream pressure through the check valve 111 and adjustable flow control valve 112. Pressure in pilot 101 can thereupon drop through the adjustable flow control valve 113 returned to sump 42 and permit return spring 69 to reinstate the normal rotational direction of the motor and brush.

Figure 7:
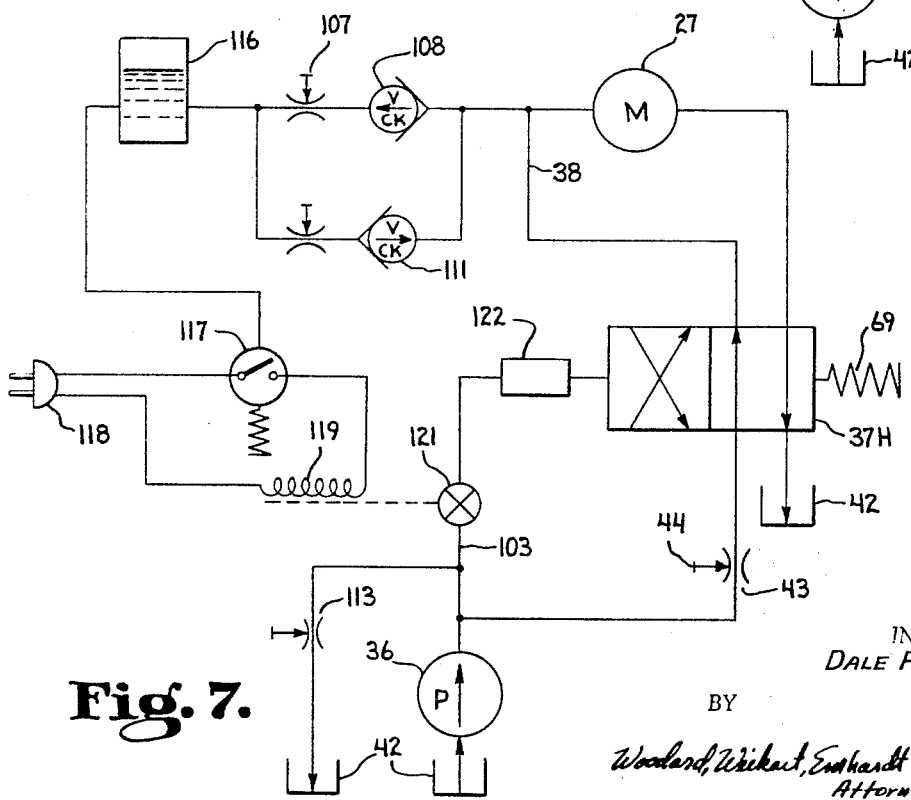
FIG. 7 is a hydraulic and electrical schematic diagram of a still further embodiment of the sensing and control system.

The arrangement in FIGURE 7 is similar to that in FIGURE 6 but an accumulator 116 is provided and the pressure sensing is by means of an electric switch 117 hydraulically closed by the pressure in line 38 applied through the valve 108, adjustable orifice 107 and accumulator 116. This supplies electrical energy from the supply line at plug 118 to a solenoid 119 to open the solenoid operated valve 121 to the pilot 122 whereupon the hydraulic pilot pressure from line 103 shifts the valve 37H against the return spring 69 to reverse the motor.

Although the system described above with reference to FIGURE 5 is considered preferable, it is recognized that combinations of electrical, hydraulic, and pneumatic devices can be employed to practice the invention. Accordingly, switches can be employed in a variety of forms including pneumatic and hydraulic valves and electrical contactors. Similarly, in addition to reversible electric and hydraulic and pneumatic motors for brush drive, unidirectional motors with electrically, pneumatically, or hydraulically reversible and controllable transmissions and clutches may also be employed.

The invention claimed is:

1. In a vehicle washer, the combination comprising:
    a brushing unit mounted for movement by a vehicle being brushed thereby, said unit having an arm, a brush rotatably supported by said arm, and means connected to said brush to rotate said brush in one rotational direction and then in the opposite rotational direction, said means including a reversible motor;
    support structure for said unit;
    an energy source for said motor;
    a first switch coupled between said source and said motor and operable in a first switched condition to supply energy from said source to said motor on a supply line to produce forward brush rotation, said switch being operable in a second switched condition to supply energy from said source to said motor on a supply line to produce backward brush rotation;
    sensing and control means coupled to said brushing unit and to said first switch to operate said switch from one of said switched conditions to the other in response to sensing of a predetermined load and thereby reverse the direction of rotation of said brush.

2. The combination of claim 1 wherein said control means includes:
    timing means coupled to said first switch for automatic return thereof to said one switched condition at a predetermined time after operationt hereof in response to sensing, to again reverse the direction of rotation and re-establish brush rotation in said one direction.

3. The combination of claim 1 wherein:
    said sensing means are adjustable to select the load to which said sensing means are responsive for reversal of brush rotation,
    said control means including timing means coupled to said first switch for automatic return thereof to said one switched condition at the end of a predetermined period after operation thereof in response to sensing, to again reverse the direction of brush rotation and re-establish brush rotation in said one direction, said timing means being adjustable for selectively predetermining the duration of said period.

4. The combination of claim 1 wherein:
    said sensing means includes a pressure responsive actuator (47) coupled to said first mentioned supply line (38);
    said control means includes a second switch (49) having an operator (48) therefor, said first switch (37) having an operator (56) therefor, said second switch (49) being coupled to said first switch operator (56) and operable to a second switched condition by said actuator (47) in response to a pressure in said first mentioned supply line above a predetermined level for supplying energy to said first switch operator, to switch said first switch to said second switched condition thereof and reverse said motor.

5. The combination of claim 4 wherein:
    said control means includes return means for said first and second switches,
    said return means on said second switch constantly urging said second switch toward a first switched condition thereof to return said second switch thereto upon decrease of pressure in said first mentioned supply line below said predetermined level, said first switch operator being thereupon connected through said second switch to an energy sink,
    said return means on said first switch constantly urging said first switch toward said first switched condition thereof.

6. The combination of claim 5 and further comprising:
    means (21) normally urging said brush against front and side surfaces of the vehicle as the vehicle is moved along adjacent said brush unit.

7. The combination of claim 5 wherein said control means further includes:
    restriction means (59) in the coupling between said first switch operator and said second switch to delay return of said first switch for a desired period of time after the return of said second switch to said first switched condition thereof,
    and unidirectional means (53) in parallel with said restriction, enabling energization of said first switch operator through said second switch without delay upon operation of said second switch to the second switched condition thereof by said actuator.

8. The combination of claim 7 wherein:
    said energy source for said motor is a high pressure source (36) of hydraulic fluid, and;
    said actuator and switches are hydraulic valves,
    said actuator directing fluid from said source to the second switch operator in response to pressure above said predetermined level,
    and said second switch directing fluid from said source through said unidirectional means to said first switch operator when said second switch is in said second switched condition thereof, said unidirectional means being a check valve.

9. A drive combination comprising:
    rotary drive means for driving output means in one rotational direction, said drive means being reversible for then driving said output means in the opposite rotational direction;
    a first switch coupled to an energy source and said drive means and operable in a first switched condition to cause said drive means to drive said output means in one direction, said switch being operable in a second switched condition to cause said drive means to drive said output means in said opposite rotational direction;
    load sensing and control means coupled to said output means and to said first switch and operable in response to the sensing of a predetermined load on said output means to operate said first switch from one of said switched conditions to the other and thereby reverse the direction of rotation of said output means.

10. The combination of claim 9 wherein said control means includes:

timing means coupled to said first switch for automatic return thereof to said first switched condition at the end of a period of predetermined duration after operation of said switch in response to sensing, to again reverse the direction of rotation of said output means and re-establish rotation thereof in said one rotational direction.

11. The combination of claim 10 wherein:

said sensing means are adjustable to select the level of said predetermined load, and;

said control means are adjustable to predetermine the duration of said period as desired.

12. The combination of claim 9 wherein said control means includes:

a second switch (49), said sensing means including an actuator switch responsive to a predetermined load to move from a first to a second condition thereof to operate said second switch from a first to a second switched condition, return means on said actuator switch urging it to the first condition thereof upon decrease of said load below the predetermined amount, and return means on said second switch (49) to return it to the first condition thereof when enabled by return of said actuator switch to the first condition thereof, to enable return of said first switch (37) to the first condition thereof, and return means on said first switch for return thereof to the first condition thereof when enabled by return of said second switch (49).

13. The combination of claim 12 wherein said control means further includes:

delay means associated with said first switch to delay, for an adjustable duration, return thereof to said first switched condition.

References Cited

UNITED STATES PATENTS 3,187,359    6/1965    Takeuchi.
3,300,803    1/1967    Seakan.

EDWARD L. ROBERTS, *Primary Examiner.*

U.S. Cl. X.R.

68—253